(12) United States Patent
Back et al.

(10) Patent No.: US 11,833,854 B2
(45) Date of Patent: Dec. 5, 2023

(54) SUSPENSION UNIT FOR A VEHICLE

(71) Applicant: Aktiebolaget SKF, Gothenburg (SE)

(72) Inventors: Daniel Back, Aschach (DE); Marco Falossi, San Raffaele Cimena (IT); Paolo A. Re, Nichelino (IT); Stefano Richaud, San Secondo di Pinerolo (IT); Marco Romanetto, Pianezza (IT)

(73) Assignee: Aktiebolaget SKF

( * ) Notice: Subject to any disclaimer, the term of this patent is extended or adjusted under 35 U.S.C. 154(b) by 488 days.

(21) Appl. No.: 16/938,179

(22) Filed: Jul. 24, 2020

(65) Prior Publication Data
US 2021/0170790 A1 Jun. 10, 2021

(30) Foreign Application Priority Data
Dec. 6, 2019 (IT) .................. 102019000023205

(51) Int. Cl.
*B60B 27/00* (2006.01)
*B60B 27/02* (2006.01)
*F16C 19/18* (2006.01)

(52) U.S. Cl.
CPC ...... *B60B 27/0078* (2013.01); *B60B 27/0047* (2013.01); *B60B 27/02* (2013.01);
(Continued)

(58) Field of Classification Search
CPC .. B60B 27/0078; B60B 27/0047; B60B 27/02
See application file for complete search history.

(56) References Cited

U.S. PATENT DOCUMENTS 7,465,102 B2 * 12/2008 Niebling ............... F16C 33/64
384/544
8,402,661 B2 * 3/2013 Kobayashi ............ F16C 33/64
29/894.36
(Continued)

FOREIGN PATENT DOCUMENTS

DE 10331180 2/2005
DE 102004059518 6/2006
(Continued)

OTHER PUBLICATIONS

Search Report for corresponding European Patent Application No. EP20187756 dated Aug. 21, 2020.
(Continued)

*Primary Examiner* — Scott A Browne
(74) *Attorney, Agent, or Firm* — Reed Smith LLP

(57) ABSTRACT

In a vehicle suspension assembly (1), a connection system (4) between a hub bearing unit (2) and a suspension upright or knuckle (3), including: a radially outer lateral cylindrical surface (16) of a radially outer ring or element (6) of the hub bearing unit, configured for interference coupling with a radially inner lateral cylindrical surface (18) of a reception seat (5) of the suspension upright or knuckle; a pair of, or three, lugs (19) that protrude radially in cantilever fashion from the radially outer ring or element of the hub bearing unit, each being provided with an axial through hole (21); a frontal surface (23) of the suspension upright or knuckle, configured for receiving the lugs (19) in axial abutment; and screws (24) fitted in a through manner through the axial holes of the lugs and screwed into respective threaded holes (25) formed in the suspension upright or knuckle, on the frontal surface (23).

9 Claims, 3 Drawing Sheets

(52) U.S. Cl.
CPC .......... *F16C 19/18* (2013.01); *B60B 27/0005* (2013.01); *B60B 27/0094* (2013.01); *B60B 2380/12* (2013.01); *B60B 2380/75* (2013.01); *F16C 2326/02* (2013.01)

(56) References Cited

U.S. PATENT DOCUMENTS

2014/0230249 A1\*  8/2014  Morita .................... B24B 7/04
                                              29/894.361
2015/0191044 A1    7/2015  Inoue

FOREIGN PATENT DOCUMENTS

| DE | 102014000975 |    | 8/2014 |            |
|----|--------------|----|--------|------------|
| DE | 102015214029 |    | 12/2016 |           |
| DE | 102015214029 | A1 * | 12/2016 |         |
| DE | 102019135117 |    | 6/2021 |            |
| JP |   2003090350 |    | 3/2003 |            |
| JP |   2003090350 | A * | 3/2003 | ............ F16C 35/067 |
| JP |   2013166518 |    | 8/2013 |            |
| WO |   2007089642 |    | 8/2007 |            |

OTHER PUBLICATIONS

Communication for corresponding European Patent Application No. EP20187756 dated Jul. 19, 2023.

\* cited by examiner

SUSPENSION UNIT FOR A VEHICLE

TECHNICAL FIELD OF THE INVENTION

The present invention relates to a suspension assembly for vehicles comprising a hub bearing unit and a suspension upright or knuckle, the assembly including an innovative connection system between the stationary ring, usually the outer ring of a rolling bearing included in, or forming, the hub bearing unit, and a suspension upright or knuckle made of light alloy.

PRIOR ART

In existing suspension assemblies, the connection of the hub bearing unit to the suspension upright or knuckle is usually made by means of a screw connection, normally using three or four screws, in which the outer ring of the rolling bearing forming part of the hub bearing unit, usually stationary, is provided towards the suspension upright with a flange or a plurality of lugs (at least four) which is or are engaged by the screws, and are then fixed in suitable holes in the suspension upright.

The radial extensions formed by the flange or by the lugs and screws increase the overall weight of the suspension assembly.

A different connection system was in use previously, consisting in a forced coupling, that is to say an interference coupling, between a radially outer lateral surface of the outer ring of the bearing forming part of the hub bearing unit and a cylindrical through hole formed through the suspension upright. Axial retention was provided by means of shoulders formed on the upright and/or resilient rings that were inserted to extend around the outer ring.

However, such a solution, if applied to suspension assemblies having an upright made of light alloy, may be affected by the differential thermal expansion between the outer ring of the bearing and the upright, as a result of which axial and circumferential displacements may occur, leading to the generation of noise, local wear phenomena, or actual deformation. This technical problem can be overcome by the use of spring devices, which again entail an increase in weight and complicated assembly operations, as well as additional costs. Furthermore, on thin bearing rings, the cavities for the articulation of the resilient rings create weaknesses and may therefore promote undesired elastic deformations or, in extreme cases, crack formation.

BRIEF DESCRIPTION OF THE INVENTION

The object of the present invention is to provide a suspension assembly for vehicles, including a connection system between a hub bearing unit and a suspension upright or knuckle forming part of the assembly, which is free of the drawbacks of the prior art while being reliable, economical, and easily assembled.

According to the invention, therefore, a suspension assembly for vehicles is provided, including a suspension upright or knuckle and a hub bearing unit, together with an associated connection system and hub bearing unit, having the characteristics stated in the attached claims.

BRIEF DESCRIPTION OF THE DRAWINGS

The invention will now be described with reference to the attached drawings, which show a non-limiting example of its embodiment, in which.

DETAILED DESCRIPTION

Figure 1:
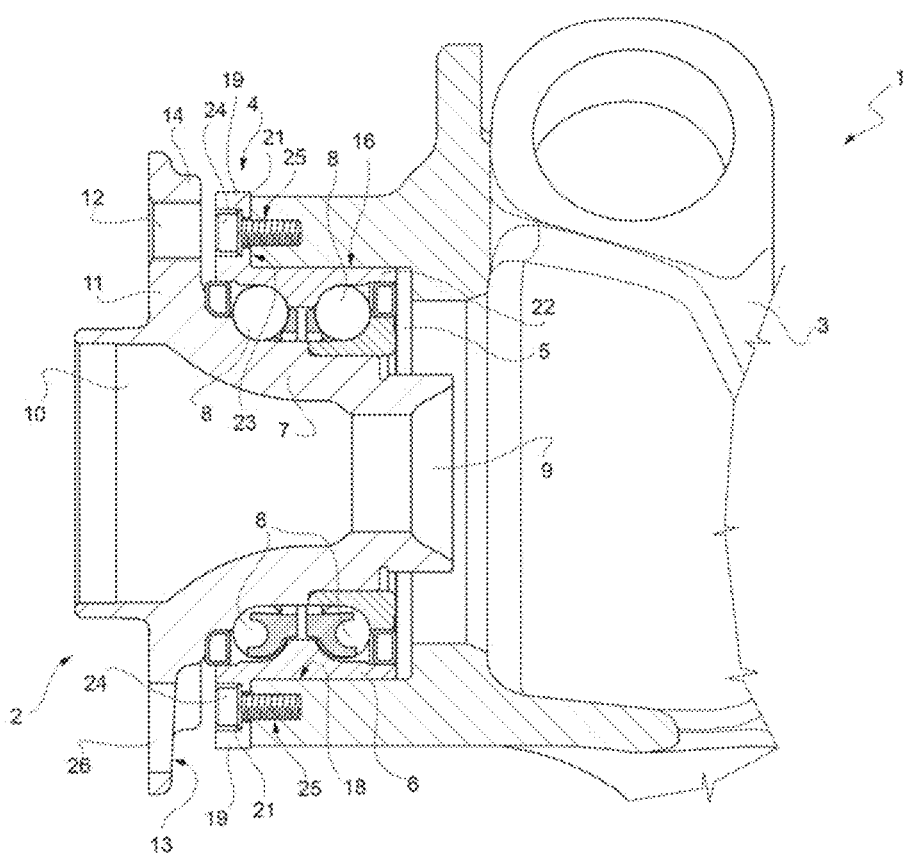
FIG. 1 shows schematically a view in elevation and in longitudinal section of a vehicle suspension assembly including a hub bearing unit, a suspension upright and an associated connection system made according to the invention.
Figure 4:
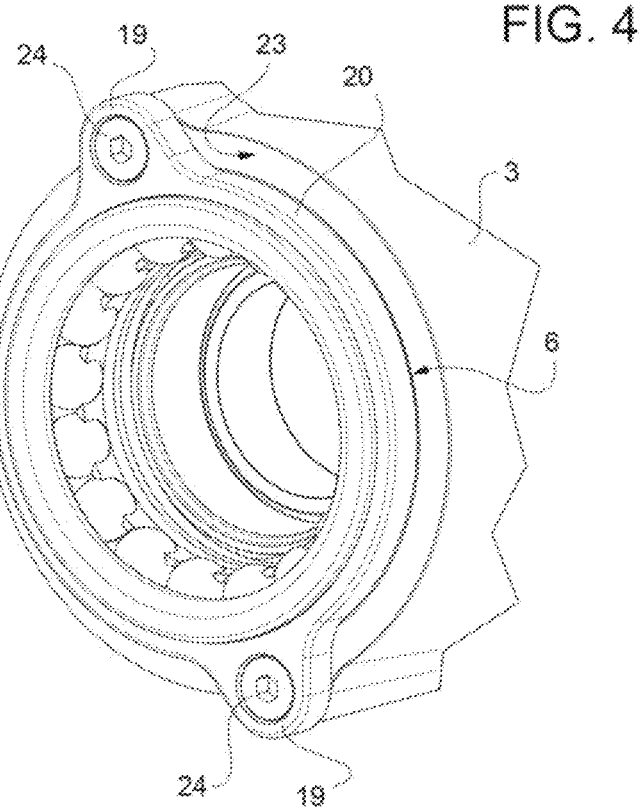
FIG. 4 shows schematically, on a reduced scale, a three-quarter perspective front view of part of the vehicle suspension assembly of FIG. 1.

With reference to FIGS. 1 and 4, in these figures the number 1 indicates the whole of a vehicle suspension assembly, comprising a hub bearing unit 2, a suspension upright or knuckle 3 for the hub bearing unit 2, and a connection system 4 between the hub bearing unit 2 and the suspension upright or knuckle 3.

The suspension upright or knuckle 3 has a known type of overall structure, and, according to an aspect of the invention, is preferably made of a light alloy by moulding or casting.

The suspension upright or knuckle 3 comprises a reception seat 5 for receiving, as will be seen, a radially outer ring or element 6 of the hub bearing unit 2.

In particular, the hub bearing unit 2 is formed, in the illustrated non-limiting example, by a rolling bearing comprising the outer ring 6, a flanged inner ring 7 and a plurality of rolling bodies 8, consisting of two rings of balls for example, interposed between the rings 6 and 7 to make the ring 7 rotatable relative to the ring 6.

The ring 7 forms a radially inner element of the hub bearing unit 2, is housed coaxially within the radially outer ring or element 6, and has a first end 9 and a second end 10 opposite the end 9.

The end 10, which in use faces in the opposite direction from the suspension upright or knuckle 3, is provided with an annular flange 11, which extends in cantilever fashion radially to the outside of both the radially inner ring 7 and the radially outer ring 6.

The flange 11 is provided with a plurality of threaded holes 12 into which corresponding captive screws, known and not illustrated for simplicity, may be fixed, by means of which screws a vehicle wheel (known and not illustrated for simplicity) is fixed, in use, to the flange 11.

At the position of the holes 12, the flange 11 is provided, on its rear wall 13 facing the suspension upright or knuckle 3, with corresponding radial strengthening spokes 14 (FIG. 2), formed integrally in one piece with the flange 11.

Figure 2:
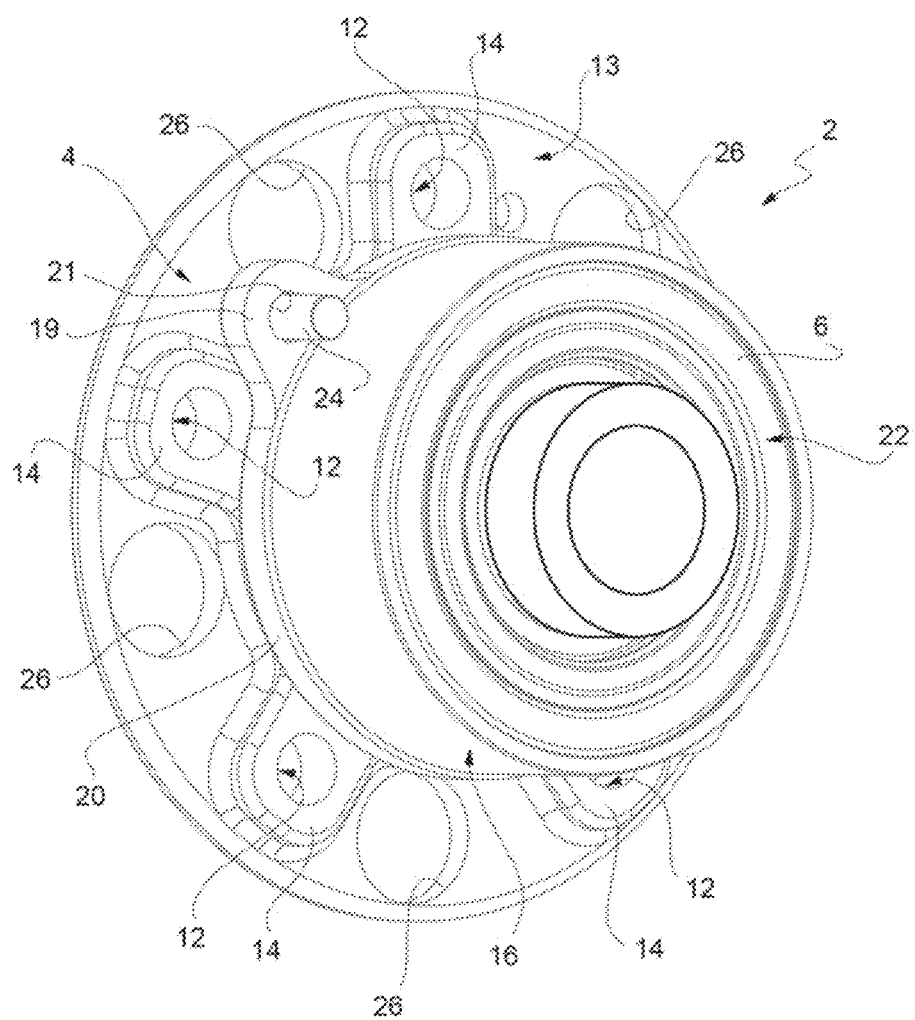
FIG. 2 shows schematically a three-quarter perspective view of the hub bearing unit of the suspension assembly of FIG. 1, provided with the connection system according to the invention.
Figure 3:
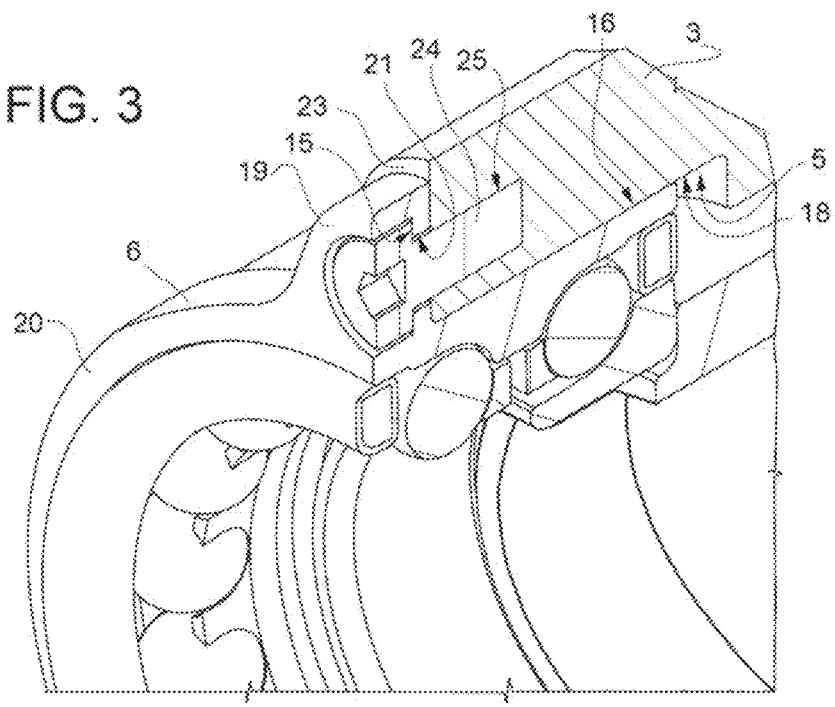
FIG. 3 shows schematically, on an enlarged scale and with parts removed for simplicity, a three-quarter perspective front and sectional view of a detail of the suspension assembly of FIG. 1.

According to an aspect of the invention, and with additional reference to FIGS. 2 to 4, the connection system 4 comprises a radially outer lateral cylindrical surface 16 of the radially outer ring or element 6 of the hub bearing unit 2, configured to couple by interference fit with a radially inner lateral cylindrical surface 18 of the reception seat 5.

The connection system 4 further comprises a lug 19 or preferably a single pair of lugs 19, or, according to a possible variant not illustrated for simplicity, three lugs 19 that protrude radially in a cantilever fashion from a front rim 20 of the radially outer ring or element 6 of the hub bearing unit 2.

The front rim 20 is opposite the suspension upright or knuckle 3, and each lug 19 is provided with an axial through hole 21.

It should be noted that, by contrast with some prior art embodiments, the lugs 19 face in an opposite direction from the end 9 of the inner ring 7; in other words, they are formed on the ring 6 towards the end 10, that is to say towards the same end or on the same side of the flange 11 of the ring 7, and therefore on the opposite side from an end 22 of the ring 6 which is opposite the rim 20 and faces in the direction of introduction of the ring 6 into the seat 5, which is cylindrical.

According to a further aspect of the invention, the connection system 4 also comprises a frontal surface 23 of the suspension upright or knuckle 3 configured to receive the single lug 19 or the plurality (two or more) of lugs 19 in axial abutment, that is to say in an interacting way in contact.

Finally, the connection system 4 comprises at least one screw 24, and preferably as many screws 24 as there are lugs 19 fitted, mounted in a through manner through the axial holes 21 of the lugs 19, each screw being screwed into a respective threaded hole 25, or preferably a pair or even a plurality of threaded holes 25, formed in the suspension upright or knuckle 3 at the frontal surface 23 of the latter.

It should be noted that, by contrast with various prior art solutions, the screws 24 are simple flat head screws, which bear on a flat end surface 15 of respective seats for the heads of the screws 19, defined by a larger-diameter portion of the through holes 21, this portion facing towards the flange 11. Conversely, in the prior art use is commonly made of spherical head screws, the head of each screw bearing on a spherical seat, the machining of which is rather costly and is no longer necessary in the solution according to the invention, thus providing savings in terms of cost, weight and overall dimensions.

According to a further aspect of the invention, the radially outer ring or element 6 of the hub bearing unit 2 is fitted at its end 22, opposite the lugs 19, into the seat 5 of the suspension upright or knuckle 3 for a substantial part of the axial length of the outer ring 6 and therefore of the lateral surface 16 and of the radially inner lateral surface 18 of the cylindrical seat 5.

Here and subsequently, "substantial part" is taken to mean a part having a length equal to at least two thirds of the overall axial length/extension of the outer ring 6 and the seat 5 respectively.

The two lugs 19 of the single pair of fixing lugs, with which the outer ring 6 is provided in the illustrated non-limiting example, protrude radially in cantilever fashion from the radially outer lateral cylindrical surface 16 of the radially outer ring or element 6 of the hub bearing unit 2, and interact by abutment with the frontal surface 23 of the suspension upright or knuckle 3.

The surface 23 faces in the opposite direction from the reception seat 5 and is preferably shaped as an annular surface.

The two lugs 19 of the single pair of lugs with which the outer ring 6 is provided in the illustrated non-limiting example, together with the corresponding two threaded holes 25 of suspension upright or knuckle 3, are, according to a further aspect of the invention, positioned to be offset in the circumferential direction by an angle α of at least 100°.

Preferably, the two lugs 19 and the corresponding two holes 25 are positioned to be offset from one another circumferentially by an angle α of 130°, or are positioned to be diametrically opposed, being offset circumferentially by angle α of 180°.

If there are three of the lugs 19, these may preferably be positioned to be uniformly spaced, at 120° from one another.

The solution or variant which includes the presence of three lugs 19 has the advantage of better handling of the workpiece during forging: in particular, when high-speed horizontal presses are used, the grip on a workpiece with only two lugs 19, which are also of small size, may give rise to problems because of the possible rotation of the workpiece. The presence of the third lug helps to enable the workpiece to be gripped and maneuvered more securely in a horizontal press. The solution with three lugs may therefore be preferable, even if the third lug may be superfluous simply as regards the securing of the ring 6 to the suspension upright or knuckle 3.

The radially inner ring or element 7 housed coaxially within the radially outer ring or element 6, with respect to which it is relatively rotatable, is provided with the flange 11 at its end 10, which faces in the opposite direction from the radially outer ring or element 6.

Additionally, the flange 11 extends radially in cantilever fashion in front of the lugs 19 and is provided, in addition to the holes 12, with at least a pair of, and preferably four, axial through holes 26, preferably spaced apart from one another symmetrically in the circumferential direction and configured for being positioned in use, selectively or simultaneously, in front of the lugs 19 to all access for maneuvering the screws 24.

It is evident from the above description that the invention also relates to a connection system 4 between a hub bearing unit 2 and a suspension upright or knuckle 3, comprising:
  a radially outer lateral cylindrical surface 16 of a radially outer ring or element 6 of the hub bearing unit 2, configured to couple by interference fit with a radially inner lateral cylindrical surface 18 of a reception seat 5 of the suspension upright or knuckle 3;
  at least one lug 19, or preferably a plurality (two or three) of lugs 19 that protrude radially in cantilever fashion from a front rim 20 of the radially outer ring or element 6 opposite to the suspension upright or knuckle 3, each lug 19 being provided with an axial through hole 21;
  a frontal surface 23 of the suspension upright or knuckle 3, configured to receive the lugs 19 in axial abutment; and
  screws 24 mounted in a through manner through the axial holes 21 of the lugs 19 and screwed into respective threaded holes 25 formed in the suspension upright or knuckle 3, around and radially outside the cylindrical seat 5, on the frontal surface 23 of the suspension upright or knuckle 3.

As described above, in this connection system 4 the frontal surface 23 of the suspension upright or knuckle 3 is annular and the lugs 19, if they are two in number, are positioned to be circumferentially offset from one another by an angle of at least 100° and are preferably diametrically opposite one another, being circumferentially offset by an angle α of 180°.

In the connection system 4 according to the invention, finally, the hub bearing unit 2, if provided with a flanged radially inner ring or element 7, as in the illustrated non-limiting example, must have the flange 11 of the ring or element provided at least a pair of, and preferably four, axial through holes 26 configured to be positioned, in use, in front of the lugs 19 to provide access for maneuvering the screws 24.

The invention therefore relates to a connection by means of screws, used in a minimal number and with the lugs 19 positioned differently from the prior art, combined with a specific design of the upright or knuckle 3 which is coupled to the outer ring 6, which is stationary in use, by means of a cylindrical radial interference coupling formed by the two lateral surfaces 16 and 18.

The combined connection using a forced coupling and screws enables the weight to be reduced, not only because the outer ring 6 is lighter than the prior art flanged rings, but also because a smaller number of screws is used, and these screws are, most notably, smaller and lighter than the screws used in the prior art.

Additionally, the cylindrical coupling, forced in a press with a specific insertion pressure (which, expressed as an interference measurement, requires a forced coupling of 100 to 180 microns) provides safe operation up to high temperatures, by compensating for the expansion of the seat 5 and maintaining adequate rigidity. At very high temperatures (180° C.), the cylindrical adhesion still contributes to the rigidity, but the axial retention is supported by the screws 24.

With reference to prior art assemblies, the tightening operation is simpler and faster, because only one or a few (two or three) screws are required. This simplicity of assembly results in a lower cost and weight, owing to the better use of the material.

By combining a suitable coupling interference, a suitable axial coupling length between the surfaces 16 and 18, and a suitable size of the screws 24, it is possible to meet all the required performance levels during operation at high and low temperature. The screw connection prevents relative rotation and axial movement between the upright or knuckle 3 and the outer ring 6, thus preventing noise generation, surface wear phenomena, and premature failure. Additionally, the retention system according to the invention has better performance in terms of rigidity at high loads, by comparison with the known solutions in which the outer ring is connected to the upright by means of a flange and screws, commonly with spherical heads.

All the objects of the invention are therefore achieved.

The invention claimed is:

1. A vehicle suspension group, comprising:
   a hub bearing unit,
   an upright or knuckle for the hub bearing unit, and
   a connection system between the hub bearing unit and the upright or knuckle;
   wherein the upright or knuckle comprises a reception seat for receiving a radially outer ring of the hub bearing unit, the reception seat comprising a radially inner lateral cylindrical surface, and an axially outer surface configured to couple to an axially inner surface on the axially outermost end of the radially outer ring of the hub bearing unit;
   wherein the connection system comprises:
      a radially outer lateral cylindrical surface of the radially outer ring of the hub bearing unit, configured to couple by interference fit with the radially inner lateral cylindrical surface of the reception seat;
      at least one lug protruding radially from a front rim of the radially outer ring of the hub bearing unit opposite to the upright or knuckle; each lug comprising an axial through-hole; and
      a screw mounted in each of the axial through holes in each lug passing through the axial holes of the at least one lug and screwed inside respective threaded holes disposed in the upright or knuckle at a frontal surface of the upright or knuckle;
      each screw comprising a head that is received within the respective axial hole;
      wherein the radially outer ring of the hub bearing unit is fitted at an end of the radially outer ring opposite to the at least one lug and into the reception seat of the suspension upright or knuckle for a substantial part of the axial length of the radially outer ring and therefore for a substantial part of the axial length of the radially outer lateral cylindrical surface of the radially outer ring and for a substantial part of the axial length of the radially inner lateral cylindrical surface of the reception seat; and
      wherein the at least one lug protrudes radially from said radially outer lateral cylindrical surface of the radially outer ring of the hub bearing unit; the connection system further comprising said frontal surface of the upright or knuckle, wherein the frontal surface is configured to receive the at least one lug in axial abutment, and the at least one lug is configured to cooperate in abutment against the frontal surface of the upright or knuckle, the frontal surface being configured to face in the axially outward direction and the reception seat being configured to face in the axially outward direction and the radially inward direction.

2. The suspension group of claim 1, wherein the frontal surface of the upright or knuckle is an annular surface.

3. The suspension group of claim 1, wherein the at least one lug comprises at least two lugs and the respective threaded holes of the upright or knuckle are arranged circumferentially staggered by an amount equal to at least 100°.

4. The suspension group of claim 3, wherein the at least one lug comprises a pair of lugs and the respective threaded holes of the upright or knuckle are arranged diametrically opposite one another, circumferentially staggered by an amount equal to 180°.

5. The suspension group of claim 1, wherein the hub bearing unit comprises a radially inner ring housed coaxially inside said radially outer ring, the inner ring is configured to be rotatable with respect to the radially outer ring; the radially inner ring comprising at a first end of the radially inner ring, facing the side opposite to the radially outer ring a radially extending flange the flange comprising at least two axial through-holes configured to be positioned in front of said at least one lug to provide access to said screws.

6. A connection system between a hub bearing unit and an upright or knuckle comprising:
   a radially outer lateral cylindrical surface of a radially outer ring of the hub bearing unit, configured to couple by interference fit with a radially inner lateral cylindrical surface of a reception seat of the upright or knuckle, the reception seat comprising a radially inner lateral cylindrical surface, and an axially outer surface configured to couple to an axially inner surface on the axially outermost end of the radially outer ring of the hub bearing unit;
   at least one lug protruding radially from a front rim of the radially outer ring of the hub bearing unit opposite to the upright or knuckle; each lug comprising an axial through-hole;
   a frontal surface of the upright or knuckle configured to receive said at least one lug in axial abutment; and
   at least one screw mounted in a through manner, through the axial holes of the at least one lug and screwed inside respective threaded holes in the upright or knuckle, at the frontal surface of the upright or knuckle, each screw comprising a head that is received within the respective axial hole;

wherein the radially outer ring of the hub bearing unit is fitted at an end of the radially outer ring opposite the at least one lug into the reception seat of the suspension upright or knuckle for a substantial part of the axial length of the radially outer ring and therefore for a substantial part of the axial length of the radially outer lateral cylindrical surface of the radially outer ring and for a substantial part of the axial length of the radially inner lateral cylindrical surface of the reception seat; and wherein the at least one lug protrudes radially from said radially outer lateral cylindrical surface of the radially outer ring of the hub bearing unit; the connection system further comprising said frontal surface of the upright or knuckle, wherein the frontal surface is configured to receive the at least one lug in axial abutment, and the at least one lug is configured to cooperate in abutment against the frontal surface of the upright or knuckle, the frontal surface being configured to face in the axially outward direction and the reception seat being configured to face in the axially inward direction and the radially outward direction.

7. The connection system of claim 6, wherein the frontal surface of the upright or knuckle is annular, and at least one lug comprises at least two lugs, arranged circumferentially staggered from one another by an angle of at least 100°.

8. The connection system of claim 6, wherein the hub bearing unit comprises a radially inner ring comprising, at a first end of the radially inner ring facing the side opposite to the radially outer ring, a radially extending flange; said flange comprising at least two axial through-holes configured to be positioned in front of said lugs to provide access to said screws.

9. A hub bearing unit configured to mate with an upright or knuckle by a connection system to the upright or knuckle, wherein the connection system comprises:

a radially outer lateral cylindrical surface of a radially outer ring of the hub bearing unit, configured to couple by interference fit with a radially inner lateral cylindrical surface of a reception seat of the upright or knuckle, the reception seat comprising a radially inner lateral cylindrical surface, and an axially outer surface configured to couple to an axially inner surface on the axially outermost end of the radially outer ring of the hub bearing unit;

at least one lug radially protruding from a front rim of the radially outer ring of the hub bearing unit facing the side opposite to the upright or knuckle; each lug comprising an axial through-hole and being configured to be in axial abutment against a frontal surface of the upright or knuckle; and at least one screw mounted in a through manner, through the axial holes of the at least one lug and configured to be screwed inside respective threaded holes of the upright or knuckle, each screw comprising a head that is received within the respective axial hole;

wherein the radially outer ring of the hub bearing unit is fitted at an end of the radially outer ring opposite the at least one lug and into the reception seat of the suspension upright or knuckle for a substantial part of the axial length of the radially outer ring and therefore for a substantial part of the axial length of the radially outer lateral cylindrical surface of the radially outer ring and for a substantial part of the axial length of the radially inner lateral cylindrical surface of the reception seat; and wherein the at least one lug protrudes radially from said radially outer lateral cylindrical surface of the radially outer ring of the hub bearing unit; the connection system further comprising said frontal surface of the upright or knuckle, wherein the frontal surface is configured to receive the at least one lug in axial abutment, and the at least one lug is configured to cooperate in abutment against the frontal surface of the upright or knuckle, the frontal surface being configured to face in the axially outward direction and the reception seat being configured to face in the axially inward direction and the radially outward direction.

* * * * *